United States Patent
Le Rhun et al.

(10) Patent No.: US 11,175,963 B2
(45) Date of Patent: Nov. 16, 2021

(54) METHOD AND DEVICE FOR DISTRIBUTING PARTITIONS ON A MULTICORE PROCESSOR

(71) Applicant: THALES, Courbevoie (FR)

(72) Inventors: Jimmy Le Rhun, Palaiseau (FR); Daniel Gracia Perez, Palaiseau (FR); Sylvain Girbal, Palaiseau (FR)

(73) Assignee: THALES, Courbevoie (FR)

(*) Notice: Subject to any disclaimer, the term of this patent is extended or adjusted under 35 U.S.C. 154(b) by 39 days.

(21) Appl. No.: 16/322,789

(22) PCT Filed: Jul. 26, 2017

(86) PCT No.: PCT/EP2017/068937
§ 371 (c)(1),
(2) Date: Feb. 1, 2019

(87) PCT Pub. No.: WO2018/024581
PCT Pub. Date: Feb. 8, 2018

(65) Prior Publication Data
US 2019/0205177 A1    Jul. 4, 2019

(30) Foreign Application Priority Data
Aug. 4, 2016   (FR) ...................... 1601198

(51) Int. Cl.
*G06F 9/50*   (2006.01)
*G06F 9/48*   (2006.01)
(Continued)

(52) U.S. Cl.
CPC .......... *G06F 9/5066* (2013.01); *G06F 8/4442* (2013.01); *G06F 9/4887* (2013.01);
(Continued)

(58) Field of Classification Search
None
See application file for complete search history.

(56) References Cited

U.S. PATENT DOCUMENTS

2007/0079150 A1   4/2007 Belmont et al.
2008/0263324 A1   10/2008 Sutardja et al.
(Continued)

FOREIGN PATENT DOCUMENTS

EP     1 501 013 A2    1/2005
WO     2014/072628 A1  5/2014

OTHER PUBLICATIONS

Castrillon, et al., "Multi/many-core programming: Where are we standing?", 2015 Design, Automation & Test in Europe Conference & Exhibition (DATE), pp. 1708-1717, Mar. 9, 2015.
(Continued)

*Primary Examiner* — Wynuel S Aquino
(74) *Attorney, Agent, or Firm* — BakerHostetler

(57) ABSTRACT

A method and a device for distributing partitions of a sequence of partitions on the cores of a multicore processor are provided. The method makes it possible to identify parameters characterizing the hardware architecture of a multicore processor, and parameters characterizing an initial ordering of the partitions of a sequence; and then to profile and classify each partition of the sequence in order to assign the execution of each partition to a core of the multicore processor while maintaining the initial sequential ordering of the partitions.

10 Claims, 3 Drawing Sheets

(51) Int. Cl.
*G06F 8/41* (2018.01)
*G06F 9/52* (2006.01)
(52) U.S. Cl.
CPC .......... *G06F 9/5016* (2013.01); *G06F 9/5038* (2013.01); *G06F 9/52* (2013.01)

(56) References Cited

U.S. PATENT DOCUMENTS

| | | | | |
|---|---|---|---|---|
| 2008/0263555 | A1* | 10/2008 | Ventroux | G06F 9/5038 718/103 |
| 2010/0199280 | A1 | 8/2010 | Vestal et al. | |
| 2011/0072233 | A1* | 3/2011 | Dawkins | G06F 3/061 711/206 |
| 2013/0111152 | A1 | 5/2013 | Couvee et al. | |
| 2015/0286574 | A1 | 10/2015 | Endou | |
| 2016/0034316 | A1* | 2/2016 | Griglock | G06F 9/5066 718/104 |
| 2016/0054933 | A1* | 2/2016 | Haghighi | G06F 3/0658 711/103 |
| 2017/0039091 | A1* | 2/2017 | Fukuda | G06F 9/5038 |
| 2018/0322024 | A1* | 11/2018 | Nagao | G06F 3/065 |
| 2019/0265777 | A1* | 8/2019 | Lee | G06F 1/3296 |

OTHER PUBLICATIONS

Pimentel, et al., "A systematic approach to exploring embedded system architectures at multiple abstraction levels", IEEE Transactions on Computers, vol. 55, Issue: 2, pp. 99-112, Jan. 1, 2006.
Stefanov, et al., "Y-Chart Based System Level Performance Analysis: An M-JPEG Case Study", Progress Workshop, Dec. 31, 2000.
Rangan, et al., "Performance scalability of decoupled software pipelining", ACM Transactions on Architecture and Code Optimization, vol. 5, Issue 2, pp. 1-25, Sep. 3, 2008.
Littlefield-Lawwill, et al., "System considerations for robust time and space partitioning in integrated modular avionics", 2008 IEEE/AIAA 27th Digital Avionics Systems Conference.

* cited by examiner

METHOD AND DEVICE FOR DISTRIBUTING PARTITIONS ON A MULTICORE PROCESSOR

CROSS-REFERENCE TO RELATED APPLICATIONS

This application is a National Stage of International patent application PCT/EP2017/068937, filed on Jul. 26, 2017, which claims priority to foreign French patent application No. FR 1601198, filed on Aug. 4, 2016, the disclosures of which are incorporated by reference in their entirety.

FIELD OF THE INVENTION

The invention relates to the field of onboard systems, and more particularly to a method and a device for distributing partitions on a multicore processor of an avionics computer.

BACKGROUND

Civil avionics computers are subject to highly constraining safety requirements, and are therefore designed in a specific way, unlike other onboard computers such as those for motor vehicles or industrial or military systems. In fact, a failure of a computer during the flight of an airliner may have catastrophic consequences for its numerous passengers. The critical characteristic of these systems operating in real time is their response time. This is because a fundamental characteristic of a real-time system is that its response time must in all cases be less than a predetermined value, called the due time, or the "deadline" according to the specialized English terminology. Indeed it is imperative that the execution time of a sequence or a frame of software tasks should be deterministic and repeatable. Special-purpose standards and regulations, such as ED-12C/DO-178C, ED-80/DO-254, ED-124/DO-297 and ARINC 653, set out specific methods for ensuring temporal determinism in the execution of the computer's applications. For reasons of safety, the execution time taken into account is the execution time in the worst case, or "Worst-Case Execution Time (WCET)" according to the specialized English terminology, which is the maximum time when various undesirable events inside and outside the system occur. To minimize these undesirable effects, one approach is to provide strict isolation between the functional subsets of a software product, in both time and memory space. There is a known way of using partitioning methods between the software applications, these methods being based on address virtualization in the memory space, using dedicated hardware resources of a memory management unit (MMU), and on the static ordering of the partitions in time.

The article by J. Littlefield-Lawwill and others, "System considerations for robust time and space partitioning in integrated modular avionics" (978-1-4244-2208-1/08 2008 IEEE) describes time partitioning for a real time operating system (RTOS) in the context of the ARINC 653 standard.

Such isolation methods operate effectively on monocore processors, including when some functions that are unfavorable to determinism are disabled and/or when time margins are applied.

However, since avionics applications are increasingly numerous and complex, for more precise 4D trajectory control, or for the new generation data or display integration for the cockpit for example, they require higher levels of performance. On the other hand, current onboard computer systems use applications on monocore computers which cannot provide better performance by increasing the operating frequency, particularly because of the increase of leakage currents in submicrometer transistors.

Thus there is a need for higher-performance computers. Multicore processors represent a good compromise between performance, power consumption and cost. On the other hand, although such processors theoretically meet the performance requirements and comply with the volume, weight and power consumption constraints of avionics, such multicore processors are not currently recommended for use in avionics, because the essential elements of space and time isolation are not ensured. Indeed, concurrent access by a plurality of cores to shared resources on the same chip leads to contention which seriously degrades temporal determinism. This mutual contention is known as "interference".

Thus a problem specific to multicore processors is that, if there is a simultaneous request by a plurality of cores for the same shared resource, including a request for access to an interconnection bus or access to the memory hierarchy, arbitration must take place at the hardware level to grant access to one core and block the others until the end of the transaction. The disadvantages of arbitration include the variability of the execution time of applications.

The variability of the execution time is not necessarily problematic for non-real-time multicore computers used for personal computers, servers or mobile terminals for example, since for these devices the average execution time is still better than with a monocore processor, and an execution time which is abnormally long is still acceptable.

However, for critical real-time applications, variability due to interference seriously degrades the capacity to evaluate the worst case execution time (WCET), which is contrary to certification requirements.

Patent application U.S. 2010/0199280 A1 by Vestal and others offers a partitioning solution for a multicore processor in the avionics field. This solution aims to estimate the effect of interference on applications executed on a multicore processor, and then to modify the ordering of these applications in order to minimize the effect of this interference. Such a modification requires a costly recertification of the system, without ensuring the absence of interference.

Consequently there is a need to provide a solution which overcomes the aforementioned drawbacks. The present invention meets this need.

SUMMARY OF THE INVENTION

To achieve this aim, an object of the present invention is to propose a device and a method for ordering software tasks on a multicore processor which are particularly suitable for critical real-time systems.

The method of the invention has the following advantages:
- it complies with the constraints established in the avionics field, and therefore it is readily acceptable for avionics authorities and certifiable;
- it can re-use an applications development process established for monocore processors;
- it requires no modification of the existing applications;
- it can improve the performance of applications sensitive to memory performance; and
- it can provide greater thermal uniformity in the processor.

In order to achieve the desired results, a method implemented by a computer for distributing the partitions of a sequence of partitions on the cores of a multicore processor is proposed. The method comprises steps consisting of:

identifying parameters characterizing the hardware architecture of a multicore processor;

identifying parameters characterizing an initial ordering of the partitions of a sequence comprising a plurality of partitions, said parameters comprising at least a number of partitions, a time interval allocated to each partition, dates of activation of the partitions, and the total execution time of the sequence;

generating a profile for each partition of the sequence on the basis of the parameters of architecture and initial ordering;

classifying the partitions according to their profile; and assigning the execution of each partition of the sequence according to the classification to a core of the multicore processor while maintaining the initial sequential ordering of the partitions.

In one embodiment, the identification of the hardware architecture parameters consists in defining at least the architecture in terms of the number of cores, the hierarchy of shared and/or private memories, the memory controllers, and the interconnection bus.

Advantageously, the profiling of the partitions consists in determining the partitions that may have a performance gain, to be coupled to a dedicated memory.

Alternatively, the step of profiling the partitions consists in determining the partitions whose execution gives rise to a hot spot which is to be reduced.

In one embodiment, the step of profiling takes into account criteria for estimating the spatial and temporal locality of the memory accesses of each partition, the number of memory accesses of each partition, the volume of data accessed, and the processor load.

The classification step may consist in calculating a value for each partition on the basis of the estimation criteria, and classifying the partitions according to the value obtained.

According to one implementation, a step of executing the sequence may be performed after the assignment step.

In one configuration, the method comprises a step of disabling all the assigned cores during the time interval in which the partition allocated to them is not executed.

In another configuration, the method comprises a step of synchronizing the execution of the partitions with one another.

The invention also includes a device for distributing the partitions of a sequence of partitions on the cores of a multicore processor, the device comprising means for implementing the steps of the claimed method.

The invention may be applied in the form of a computer program product comprising code instructions for carrying out the steps of the claimed method when the program is executed on a computer.

BRIEF DESCRIPTION OF THE DRAWINGS

Various aspects and advantages of the invention will be disclosed to support the description of a preferred, but non-limiting, embodiment of the invention, with reference to the figures below.

DETAILED DESCRIPTION

The following description is applicable to examples to provide a clear understanding of the principles of the invention and a specific application, but is not in any way exhaustive and must allow those skilled in the art to make modifications and devise variant embodiments while retaining the same principles. Thus the present description of the invention is provided to illustrate a preferred embodiment in the field of avionics computers, but is non-limiting, and could be used in other fields benefiting from the use of multicore processors.

Figure 1:
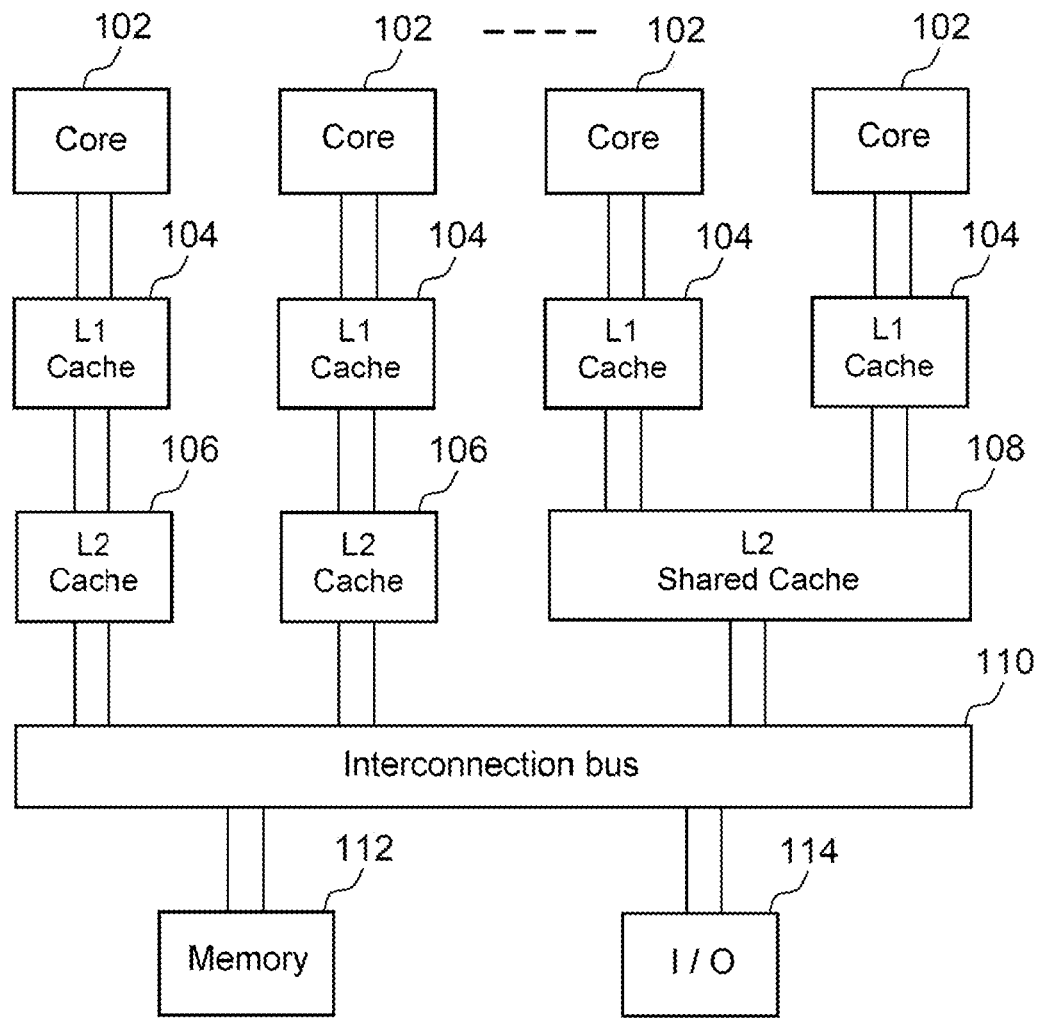
FIG. 1 shows a multicore processor architecture in which the method of the invention may be applied.

FIG. 1 shows in a simplified manner a multicore processor architecture (100) in which the method of the invention may be applied.

A multicore processor contains a plurality of processor cores, which may typically vary from 2 to 12. The processor (100) comprises first level cache memories (104), called "L1" cache memories, and second level cache memories (106, 108), called "L2" cache memories. The first level cache memories (104) are associated, respectively, with a processor core (102) and are called private cache memories. The second level cache memories may be either memories (106) that are private to a particular processor core, or memories (108) shared among a number of cores. The processor may also comprise shared third level cache memories (not shown), called "L3" cache memories.

The multicore processor further comprises one or more memory controllers (112) which may be external memories of the type known as "double data rate" (DDR) in the specialized English terminology, and various shared input-output ("I/O") peripherals (114). All the elements of the processor are interconnected by a shared interconnection bus or set of buses or network (110).

The processor further comprises an ordering module (116) for controlling the partitioning of the software tasks or the applications. This module is typically implemented in the form of software, called a hypervisor or a real time operating system according to the circumstances, this software being specially designed to ensure temporal and spatial isolation between partitions in accordance with the ARINC653 standard.

Figure 2:
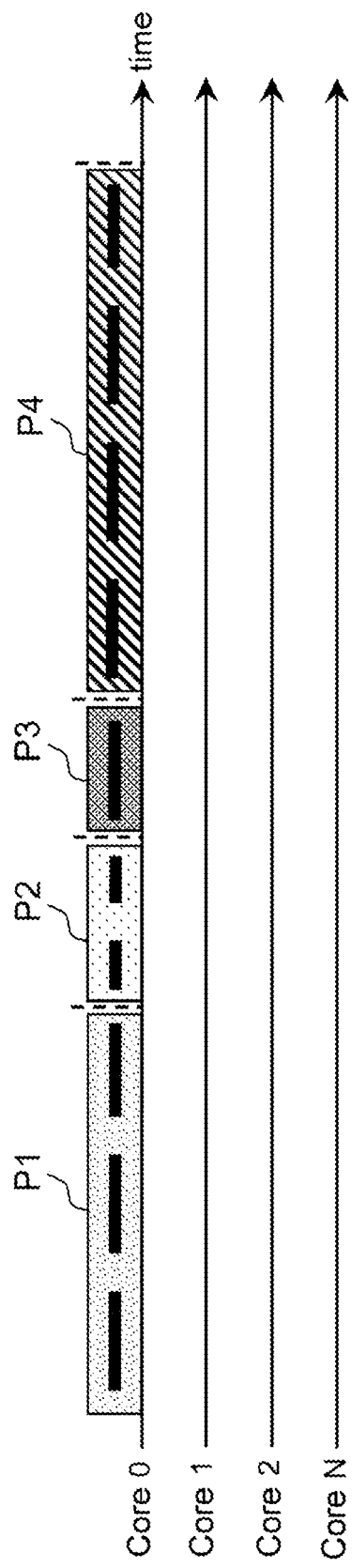
FIG. 2 shows an example of sequential monocore ordering of partitions.

FIG. 2 shows an example of partitioning according to the prior art, in the case of either a monocore processor (C0) or a multicore processor (C0 to CN) using only one core. The horizontal axis represents time, and the vertical axis represents the cores of the processor. In the example, four partitions are executed during one sequence. The partitions are repeated in a cyclic pattern (P1, P2, P3, P4), only one pattern being shown. The partitions may have different durations. Within each partition, one or more software tasks 'T' are executed sequentially. Thus, during the first partition 'P1', three tasks 'T1-1' to 'T1-3' are executed, then within the second partition 'P2' two tasks 'T2-1' and 'T2-2' are executed, a single task 'T3-1' is executed within the third partition 'P3', and four tasks 'T4-1' to 'T4-4' are executed within the fourth partition 'P4'. The temporal isolation between each partition is shown by vertical broken lines, and is not described in greater detail, since any known method of temporal isolation would be feasible. The gaps between partitions correspond to system times, to permit ordering according to the operating system.

Figure 3:
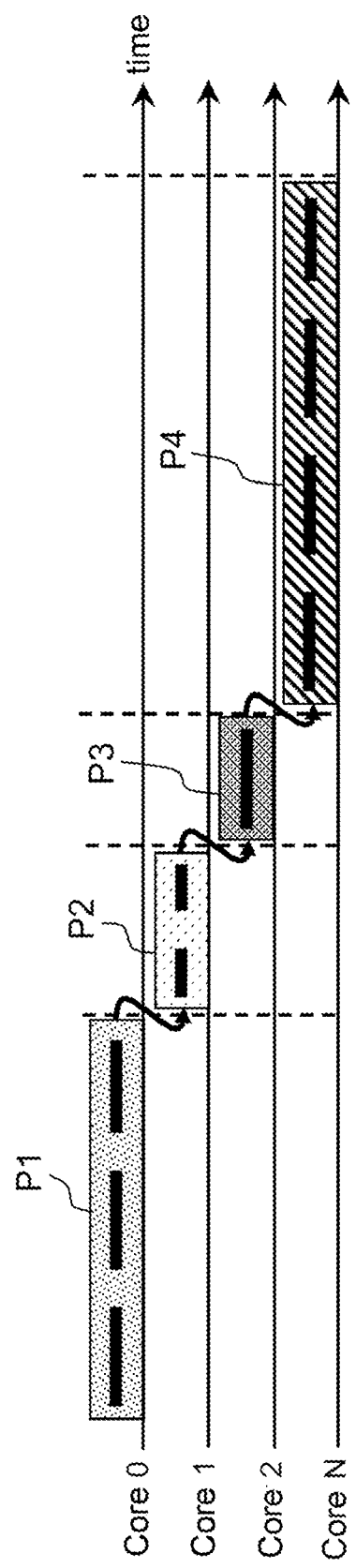
FIG. 3 shows an example of sequential multicore ordering of partitions in an embodiment of the invention.

In general terms, as shown in FIG. 3, the principle of the invention is that of allocating a separate processor core to each partition belonging to a frame comprising a plurality of partitions, without modifying the ordering of the partitions. The sequencing of the partitions remains the same, each partition being deployed on a different core, and each partition core advantageously executing only one partition. Advantageously, the proposed mechanism provides the benefit of a performance gain in a multicore processor, while complying with the existing constraints as in a monocore processor.

Thus, in FIG. 3, which returns the example of FIG. 2, a sequence comprising four partitions is shown. The first partition 'P1' is executed on the core 'C0', the second partition 'P2' is executed on the core 'C1', the third partition 'P3' is executed on the core 'C2' and the fourth partition 'P4' is executed on the core 'C3'. A person skilled in the art will understand that FIG. 3 is purely a simplified example, chosen to provide a clear understanding of the principles of the invention, without being limiting in any way as regards the number of partitions, the number of tasks within each partition, the duration of each partition or the number of cores to which the partitions are to be allocated.

In an embodiment in which the number of partitions in the sequence is less than or equal to the number of available processor cores, the allocation of the partitions to the processor cores according to the principle of the invention provides a gain in terms of access to memory space. This is because, since each partition is deployed on a core assigned to it, it has the exclusive use of the cache memories associated with this core. Moreover, since the sequential ordering of the partitions is maintained, the constraint of temporal isolation is conserved, only one partition being executable at a given moment, after the end of the preceding partition.

Advantageously, the static sequential ordering ensures that there is no interference, and therefore ensures full sequencing of the execution, which is similar to that of the execution of all the partitions on the same core. Furthermore, an individual core is not subject to the requirement to suppress residual data and instructions from the memories, as is the case in monocore ordering, since each core always executes the same partition, and it can keep this information in cache memory for activation of the partition in the next activation. Advantageously, the principle of the invention makes it possible to save the time spent on inhibiting the private cache memory and the time spent in reloading data into it from the external memory, on each activation of the partition.

In a mode of implementation in which the processor architecture is called "clusterized", having L2 cache memories shared by a subset of cores (such as 108 in FIG. 1), the principle of the invention makes it possible, in a first variant, to limit the assignment of the partitions to a single core per cluster or a subset of cores, and to operate as if the L2 cache memory were private. In another variant, all the cores of the same cluster are used to operate as in a case where the L2 cache memory is shared. The present invention can then be applied to the private cache level or levels only.

Alternatively, in another variant, an optimized intra-cluster policy may be specified, for example by providing spatial partitioning of the L2 cache by coloring methods or by a configuration of the L2 cache or MMU, if the processor permits this.

In an embodiment in which the number of partitions in the sequence is greater than the number of cores available on the processor, the method of assigning partitions according to the invention makes it possible to determine the partitions requiring most resources or the most critical partitions, in order to allocate each of them to a dedicated core, and to retain single-core operation for all the other partitions. Advantageously, therefore, the method makes it possible to deal with cases in which all the partitions that are unsuitable for sole execution on a core are assigned to a remaining core. To ensure the temporal isolation of the partitions executed on a single core, a cache inhibiting process may be activated during the move from one partition to another, to ensure that each partition starts in a known state of the system. Alternatively, the inhibition between two consecutive executions of the same partition on a core may be omitted if no other partition has been executed on this core in the meantime.

Figure 4:
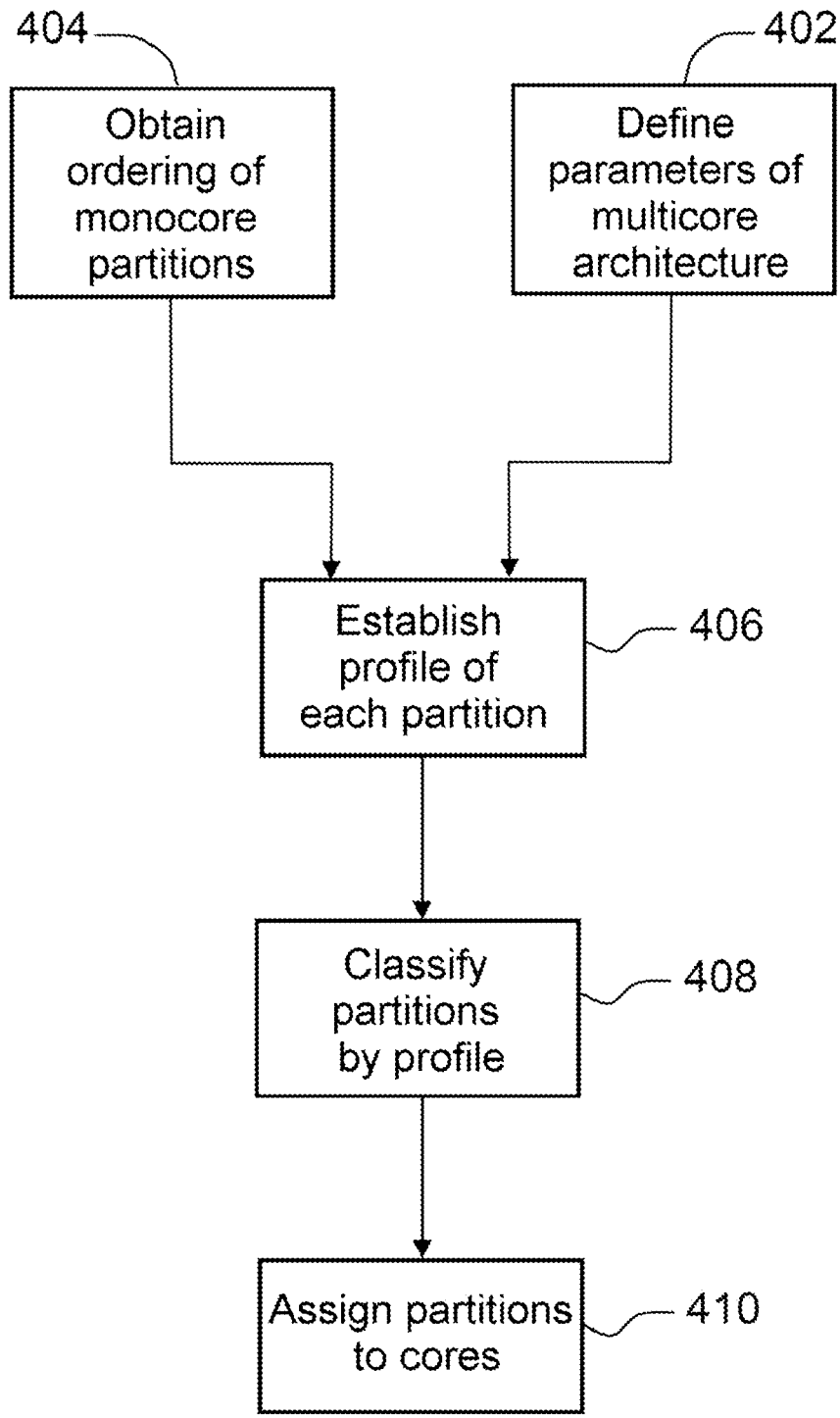
FIG. 4 shows a chain of steps of the method for assigning partitions to cores according to an embodiment of the invention.

FIG. 4 shows a chain of steps (400) of the method for assigning partitions to a plurality of cores of a multicore processor according to one embodiment. The steps of the method may be executed by dedicated execution modules of a multicore processor as shown in FIG. 1. The method starts with a step (402) of identifying the parameters of the hardware architecture of the multicore processor, comprising at least the number '$N_c$' of cores of the processor and the hierarchy of the memories in terms of private memories and shared memories, and preferably the description of the private and shared data paths or the physical location of the modules on the chip. In one embodiment, the architecture parameters are supplied by a user, and depend on the final integration of the processor into an avionics application. Alternatively, the parameters may exist ahead of an architecture and may be obtained from architecture files.

In another step (404), which may be simultaneous or deferred, the method may be used to define the parameters of the initial ordering of the partitions for monocore sequencing. The initial ordering may exist ahead of a multicore processor architecture which operates in monocore mode, or may be specified for a new architecture to be configured in multicore operation. The initial ordering parameters comprise, at least, the number '$N_p$' of partitions, the time interval '$T_p$' allocated to each partition, the dates of activation of the partitions, and the total time of the sequence of execution of the partitions.

In a subsequent step (406), the method may be used to establish a profile of each partition according to different criteria. The profiling of the partitions makes it possible to determine the partitions that may have a performance gain and are to be coupled to a dedicated memory in order to prevent memory inhibition at the start of execution of the partition, or to determine the partitions whose execution gives rise to a hot spot that is to be reduced.

In a preferred embodiment, the profiling of the partitions takes into account the parameters of hardware architecture and initial ordering, and is based on a number of estimates:
the spatial and temporal location of the memory accesses of each partition, which may be approximated by the estimate of:
the distribution of "cache misses" (attempts to access a data element that is not available in the cache memory, causing it to be loaded from the next level of the memory hierarchy) within the time allocated to the partition;
the number of memory accesses of each partition, the volume of data accessed, and possibly their distribution between reads and writes; and
the processor load (rate of occupation of the computing resource over time).

The estimate of the spatial and temporal locality of the memory accesses may be used in order to know the re-use of the data in the caches (the term used for this is the "cache hit/miss rate"). This provides a better understanding of the positive/negative effects that flush operations may have on an application. Thus an application with a high spatial/temporal locality will suffer considerably from a flush, whereas an application with a low locality will not suffer much. The estimate of spatial and temporal locality may also make it possible to know whether or not two partitions with a shared cache (L2) may be good candidates for sharing the L2 cache (in the case of a clusterized architecture).

The estimate of the volume of memory accesses provides a better knowledge of the use of the memory hierarchy. A partition accessing few data (typically with a high locality) will benefit more from exclusive access to a private cache memory, even a small one, whereas a partition accessing large amounts of data will always cause reloading of the cache memory.

The estimate of the processor load may provide a better knowledge of the heat distribution on the chip. Advantageously, this criterion enables the heat distribution to be improved, and, instead of concentrating the activity on a single core, the method of the invention enables the activity to be distributed over all the cores of the chip and to spread the heat dissipation over the whole surface of the chip. Thus the heat flow to be dissipated is minimized, the temperature is more uniform, and the reliability of the computer is improved as a result. This is because large temperature variations within the same chip may create faults on the contacts at the nanometric scale, in the form of mechanical fatigue due to expansion.

In a subsequent step (408), the method may be used to sort the partitions and establish a classification. In one embodiment, the partitions are classified according to a value which is calculated for each partition on the basis of estimation criteria.

In a variant, each criterion may be assigned a relevance weighting which may be defined on the basis of the avionics application.

In a subsequent step (410), the method may be used to assign the '$N_p$' partitions to different cores according to the classification resulting from the preceding step.

In a variant implementation in which the number of cores '$N_c$' of the processor is less than the number '$N_p$' of partitions, the method may be used to assign '$N_c$-M' partitions at the head of the classification to '$N_c$-M' cores and to assign all the remaining partitions to the 'M' remaining cores.

In another variant implementation, steps (408) and (410) are combined to provide a direct allocation according to the selected criterion. For example, if the criterion is thermal, the method may be used to place the "hotter" partitions (that is to say, those having the highest CPU load) in the most distant cores.

In another variant implementation, the method may comprise a supplementary step of re-evaluating the time allocated to each partition operating on a different core, and thus providing a supplementary time budget, allowing for changes to applications, for example.

In another variant implementation, the method may comprise a supplementary step of disabling the cores during the time in which the partition allocated to them is not executed. In one embodiment, the disabling may be performed by clock decoupling, or "clock gating", in order to save the populated cache memories and ensure immediate starting. This provides an induced benefit on the service life and reliability of the component. It also results in a gain in power consumption.

In a variant implementation, the method for assigning partitions to the processor cores comprises a mechanism for synchronizing the partitions with one another. This is because it must be ensured that a partition cannot start on one core before the preceding partition is terminated on another core. The method may be implemented by known methods such as synchronization barriers, or may use a single orderer timed by a global clock which is automatically available in the components concerned for avionics applications Persons skilled in the art will understand that changes may be made to the preferentially described method, while maintaining the principles of the invention. Thus the examples described are based on an architecture of a multicore processor on a single chip, but the principles of the invention may be applied to other variants of distributed architecture of multicore processors, varying in terms of the number of cores, the interconnection topology, the depth and topology of the memory hierarchy, or the distribution of the shared resources, for example.

The method of the present invention may also be implemented on the basis of hardware and/or software elements. It may be available as a computer program product on a computer-readable medium. The medium may be electronic, magnetic, optical or electromagnetic, or may be a broadcasting medium of the infrared type, for example.

The invention claimed is:

1. A computer implemented method for distributing partitions of a sequence of partitions on cores of a multicore processor, the method comprising steps of:
identifying first parameters characterizing a hardware architecture of a multicore processor;
identifying second parameters characterizing an initial ordering of a plurality of partitions of a periodic sequence, said second parameters comprising at least a number of the partitions, a time interval allocated to each of the partitions, an activation date for each of the partitions, and a total time of executing each of the partitions;
generating a profile for each of the partitions on the basis of the first parameters and of the initial ordering, wherein each of the generations takes into account one or more criteria for estimating spatial and temporal locality of memory accesses of the respective partition, a number of the memory accesses, a volume of data accessed, and processor load;
classifying each of the partitions according to the respective profile;
assigning the execution of each of the partitions according to the respective classification to a core of the multicore processor such that the execution of each of the partitions is performed on the same core, while maintaining the initial ordering; and
executing the sequence of partitions.

2. The method as claimed in claim 1, wherein the identification of the first parameters comprises at least:
defining the hardware architecture in terms of a number of cores of the multicore processor, a hierarchy of shared and/or private memories, memory controllers, and an interconnection bus.

3. The method as claimed in claim 1, wherein the generations comprise determining the partitions that have a performance gain, to be coupled to a dedicated memory.

4. The method as claimed in claim 1, wherein the generations comprise determining the partitions the execution of which gives rise to a hot spot to be reduced.

5. The method as claimed in claim 1, wherein each of the classifications comprises:
   calculating a value for the respective partition on the basis of the one or more criteria, and classifying the respective partition according to the value.

6. A device for distributing partitions of a periodic sequence on cores of a multicore processor, the device comprising means for implementing the steps of the method as claimed in claim 1.

7. A non-transitory, computer-readable medium comprising instructions for carrying out the steps of the method according to claim 1, when said instructions are executed on a computer.

8. The method as claimed in claim 1, further comprising:
   assigning an execution of each of a plurality of other partitions of another periodic sequence according to a respective classification to another core of the multicore processor such that the execution of each of the other partitions is on the same other core, while maintaining an initial ordering of the other partitions of the other periodic sequence.

9. The method as claimed in claim 8, further comprising:
   disabling the assigned cores during the time interval in which the partition allocated to the cores is not executed.

10. The method as claimed in claim 8, further comprising:
    synchronizing the executions of the partitions between the respective cores.

* * * * *